2 Sheets, Sheet 1.

H. S. Shepardson,

Indicator Lock.

No. 107,414.   Patented Sep. 13, 1870.

Witnesses:
Phil. T. Dodge
Henry N. Myggatt

Inventor:
H. S. Shepardson
by Dodge & Munn
Attys

H. S. Shepardson,
2 Sheets. Sheet 2.

*Indicator Lock.*

No. 107,414. Patented Sep. 13, 1870.

Witnesses:
Phil. T. Dodge
Henry N. Myggatt

Inventor:
H. S. Shepardson
by Dodge & Munn
Attys.

United States Patent Office.

HENRY S. SHEPARDSON, OF SHELBURNE FALLS, MASSACHUSETTS.

Letters Patent No. 107,414, dated September 13, 1870.

IMPROVEMENT IN COMBINATION AND REGISTER-PADLOCKS.

The Schedule referred to in these Letters Patent and making part of the same

*To all whom it may concern:*

Be it known that I, HENRY S. SHEPARDSON, of Shelburne Falls, in the county of Franklin and State of Massachusetts, have invented certain Improvements in Padlocks, of which the following is a specification, reference being had to the accompanying drawing.

My invention relates to padlocks; and

The invention consists in providing the lock with a series of rotary tumblers, operated by cog-wheels, and so arranged that they can be disconnected from the operating wheels without opening the lock, and thus change the combination on which the lock is closed or opened at will.

It further consists in providing the lock with a register, which is operated by the closing of the lock, and having a cover that will automatically close the opening to the register, when the lock is opened, to prevent tampering with the register, all as hereinafter more fully explained.

Figures 3, 4, 5, 6, 7, 8, 9, 10, 11, 12, 13, 14, 15, and 16 are views of the parts shown more in detail.

Figure 1:
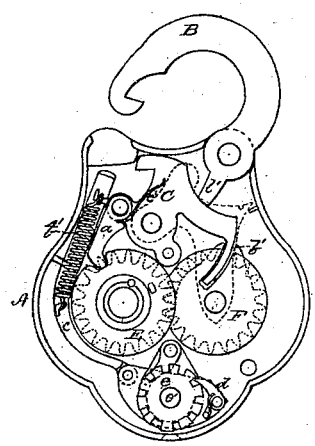
Figure 1 represents the lock opened, with the front of the case and the cover of the register and operating disk removed, to more fully exhibit the mechanism.
Figure 2:
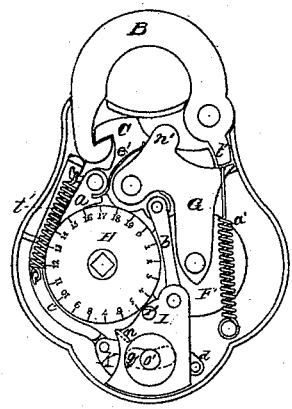
Figure 2 represents the lock complete, with all its operating mechanism in place, with the lock closed, the front of the case being removed, to show the interior.

In constructing my improved lock, I make the case A in the form shown in the drawing, or in any other suitable form, for containing the operating parts, and pivot to it a swinging hasp, B, which latter has its rear end projecting some distance below the pin on which it turns, and within the case, as shown in figs. 1 and 2.

Figure 5:
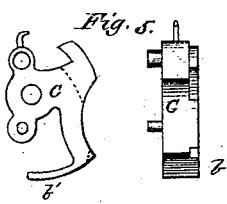

It a suitable position to lock into a notch in the front end of the hasp B, I pivot a swinging dog or locking-bolt, C, the rear end of which is curved downward, so as to form an arc of a circle, concentric with the pin or center on which the dog C turns, this dog being shown detached in fig. 5, and in position in figs. 1 and 2.

I then provide a series of rotary tumblers, F, which have a slot cut in them, for the curved end of the dog to enter, when thrown back, as represented in fig. 1.

Figure 3:
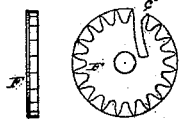

These tumblers have a series of cogs or teeth formed on their periphery, about two-thirds of the width of their face, the remaining portion being left projecting in the form of a smooth edge or disk, entirely around, except where the slot $c'$ is cut in them, one of these tumblers being shown detached in fig. 3, which represents both a side and an edge view.

Figure 10:
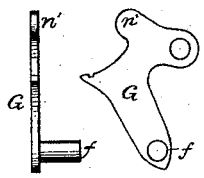

These tumblers are mounted on a pin or journal, $f$, fixed in or projecting from the under side of a swinging arm, G, which is pivoted on the same pin or stud that supports the locking-dog C, as shown in fig. 2, and in dotted lines in fig. 1, the arm G being longer than the dog C, so as to bring the tumblers F into the requisite position to permit the curved arm of the dog C to enter the slot $c'$ of the tumblers, the arm G being shown detached in fig. 10.

Figure 6:
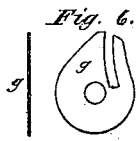

Between each of the tumblers F I place a washer, $g$, which has a slot corresponding to that of the tumblers, as represented in fig. 6, these washers having a projection on their edge, where the slot is, of such a length that the curved arm of the dog never entirely leaves the slot in them, thereby preventing the washers from turning, and thus serving to prevent the tumblers from turning each other by the friction of their sides or faces.

Figure 4:
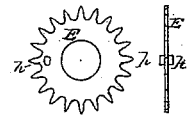

To operate these tumblers, I provide a corresponding series of cog-wheels, E, as represented in fig. 4.

These wheels E are mounted loosely on a tubular stud, located in such a position in the case that they will gear into the tumblers F when the swinging arm G is in its normal position, as represented in figs. 1 and 2, a spring, $a'$, shown in fig. 2, serving to hold the arm G, so as to keep the wheels and tumblers in gear, except when purposely thrown out of connection, which may be done at any time when the lock is open, by throwing the hasp back far enough to cause its inner projecting end, $l'$, to strike against the shoulder $n'$ on the arm G.

These wheels E each have a pin, $h$, projecting from each face, as shown in fig. 4, so that, when arranged on the stud, with a stationary washer between them, as one of them is turned, its pin $h$ will strike against the corresponding pin on the adjoining face of the next wheel, and thus communicate motion to it also; and so on, continuously, through the entire series.

Figure 7:
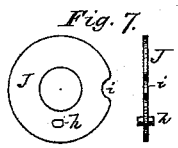
Figure 13:
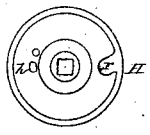
Figure 13:

Upon the same stud, over these wheels, I place a notched geared plate, J, which is provided, in like manner, with pins, $h$, as shown in fig. 7, and over this I mount still another plate or disk, H, provided with a similar pin on its under side, and having a corresponding notch, $r$, as represented in fig. 13, this disk H also having a projecting flange upon its upper face, with a series of graduation marks and numbers marked on it, as shown in fig. 2. It has, also, a tubular stem, projecting centrally from its under side, which fits into the tubular stud on which the wheels are mounted, this stem having a square or other form of hole, extending longitudinally through or into it, to receive and hold the operating key by which the dial disk H may be turned, and made to communicate motion to the guard-plate J, wheels E, and, through them, to the tumblers F, and, also, to the swinging dog C, by means of the pawl $a$, when properly adjusted for opening the lock, as hereinafter explained.

Upon the front end of the locking-dog C I pivot a pawl, $a$, which has its lower end suitably located to fall into the notches in the edges of the plate J and disk H when the notches are brought in line, a spring, $e'$, serving to keep the free end of the pawl pressed against the edge of these disks, as shown in figs. 1 and 2.

In the lower part of the case A I locate a register, which consists of a series of wheels, $e$, having the numerals from 1 to 0 marked on their periphery.

These wheels are notched between each number, and are mounted on a fixed stud, $o'$, on which they turn loosely.

Between each of the wheels is placed a curved spring pawl, $m'$, to hold them from being accidentally moved backward, and they are also provided with suitable pawls for preventing all but the upper wheel from turning, except at proper intervals, these devices being common in registers.

To operate this register, I place underneath the wheels $e$ a plate, K, which projects, at its ends, on opposite sides of the wheels $e$, as shown in figs. 1 and 2, this plate being pivoted, near its center, close alongside of the stud $o'$, on which the wheels $e$ are mounted.

Figure 8:
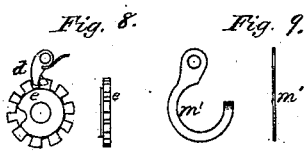
Figure 9:

To the rear end of this plate is secured a vertical stud, $k$, on which is pivoted the pawls that operate the wheels, the upper pawl, $d$, being shown in connection with the wheel $e$, in fig. 8.

Figure 11:
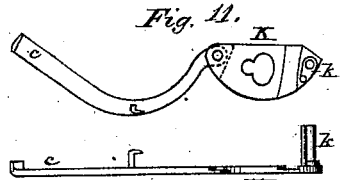

To the front end of the plate K I pivot an arm, $c$, as shown in fig. 11, which is curved, so as to lie within the case A, along its front edge, and has its upper end extending up to near the mouth or opening into which the front end of the hasp enters when the lock is closed, it being so arranged that, as the hasp is closed, it will strike against the end of the arm $c$, and, by pushing it down in the case, cause the plate K to vibrate on its pivot, thereby throwing up its opposite end, carrying forward the pawl $d$, which, being engaged with the upper wheel, $e$, of the register, carries it forward one notch.

A spiral spring, $t'$, is connected, at one end, to this arm $c$, and at the other end to the front of the locking-dog C, which thus serves to draw the plate K, with its pawls, back, ready for another movement, and, also, to draw the dog C forward, to engage with the hasp B, when the latter is shoved in to close the lock.

Figure 14:
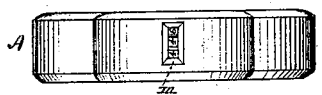

By this arrangement, it will be seen that, when the lock is closed, the register records a certain number, which can be seen through an opening, $m$, made in the bottom of the case for that purpose, as shown in fig. 14, and that, each time the lock is opened and closed, the number will be increased by one, in regular succession, and that thus the person having charge of the lock can tell at a glance whether or not the lock has been opened during his absence.

To prevent tampering with the register, through the opening $m$, I provide a plate, I, which is placed over the register, and is pivoted on a stud, $r'$, and connected by a link or rod, $b$, with the swinging dog C, as shown in fig. 2.

Figure 15:
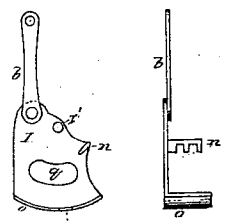
Figure 16:

The plate I has a curved slot, $q$, cut in it, to fit over the stud $o'$, and permit it to swing to and fro on its pivot or stud, $r'$, as the dog C swings back and forth in the act of locking or unlocking the hasp B, the plate I, with its connecting-link, being shown detached in fig. 15.

To one edge of this plate I is secured a notched bar, $n$, the projections on which engage in the notches of the register-wheels, as the lock is closed, thereby locking the wheels $e$ fast, and preventing them from being turned.

Along the lower end of the plate I, I secure a plate or lip, $o$, which stands at right angles to the face of the plate I, and is curved longitudinally, to correspond with the rim of the case, and has an opening, $p$, cut through it, to correspond with the opening $m$ in the case.

When the plate I is secured in position, as represented in fig. 2, this lip, $o$, is slipped down between the register-wheels and the bottom of the case, and the parts are so arranged that, when the dog C is thrown forward, the plate I has its lower end moved to the right, thus bringing the opening $p$ in the lip or guard $o$, opposite the opening $m$ in the case, thereby permitting the number opposite the opening to be seen; but, as the dog C is thrown back to open the lock, it throws the guard $o$ to the left, thereby closing the opening $m$, and shutting off access to the register-wheels, which are then released by the swinging away from them of the notched bar $n$.

By this arrangement the number can be seen when the lock is closed, at which time the register-wheels are locked fast; but when the lock is opened, at which time the register-wheels are released, the opening $m$ is closed by the slide or guard $o$, and the wheels $e$ can neither be seen nor reached from the outside.

Figure 12:
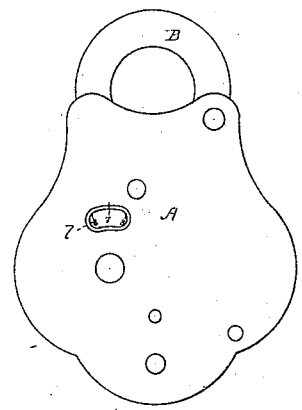

In order to permit the numbers on the dial H to be seen, an opening, $l$, is made at a suitable point, in the front side of the case, as shown in fig. 12.

With a lock thus constructed, the operation is as follows:

To close it, it is only necessary to press the hasp shut, when the spring $t$, operating on the dog C, draws it forward, causing its front end to enter the notch in the hasp B, and thereby locking the hasp firmly in position.

To open it, the key is inserted in the hole in the center of the dial-plate H, which is then turned around several times, or until the pin on its under side shall strike against the pin on disk J, and that, in like manner, turned until its pin strikes that of the first wheel E, and so on until all the wheels are moved, the last one of the series, in turn, moving the tumbler to which it is geared, until the slot $c'$, in the tumbler is brought opposite the arm $b'$, on the locking-dog C, a careful count being kept of the number of turns given to the dial or key, and the number at which it stops being likewise noted.

When this lower tumbler is thus arranged, with its slot ready to receive the arm $b'$ of the dog, the key, with the dial H, are reversed, and turned in the opposite direction several times, until motion is communicated to the second tumbler, and its slot is, in like manner, brought to the same position as the first, opposite the arm $b$, the number at which the dial stops being noted as before. When that is done, the key and dial are again reversed, and turned in the same direction as at first, until, in like manner, the third tumbler is brought, with its slot, in line with the others, the number of turns and the number at which the dial stops being noted again. The dial is then reversed, and turned until the notch $i$, in the plate J, is brought opposite the end of the pawl $a$, the number at which it stops being noted, as before.

Again, the motion of the dial is reversed, and the dial turned until the notch $r$ in the dial is brought opposite the end of the pawl $a$, the number on the dial being again noted. Now, by turning the dial slightly to the right, with the end of the pawl $a$ resting in its notch, the pawl $a$ is shoved up, thereby pushing back the swinging dog C, until it is disengaged from the hasp, which is then thrown out by the spring $t'$ operating on the arm $c$, which pushes against the front end of the hasp, as represented in fig. 2, the arm $b'$ of the dog C resting in the slots $c'$ of the tumblers, when the lock is opened, which prevents the tumblers from being turned until the lock is closed.

The number of turns given each time to the dial H, together with the numbers at which the dial is stopped each time, thus forms a guide, or as technically termed, the "combination," on which alone, the lock can be opened.

If at any time it is desired to change this combination, it can be done by pressing the hasp back, until its projecting arm $l'$ strikes the shoulder $n$ on the swinging arm G, thereby throwing the lower end of this arm to the right, and thus disengaging the tumblers from the operating wheels E, when the wheels can be turned, all together or separately, to any extent desired, by means of the key; and, of course, when the tumblers are swung back into gear with the wheels, their relative positions will be changed; and hence, the "combination" will have been correspondingly changed. As the movement of any one of the wheels the distance of a single tooth, when disengaged from the tumblers, will change the combination, it will be seen that an enormous number of changes can be made, even with a few tumblers, the number of combinations varying with the number of tumblers, and also with the number of teeth on each wheel.

It is obvious that any desired number of tumblers may be used, and that a lock constructed on this plan, with but a single tumbler, is susceptible of as many different combinations or changes as there are teeth on the tumbler, or on its operating wheel.

One great advantage of this style of lock is that the combination can be changed without touching the tumblers, or having access to the interior of the lock in any manner other than opening the hasp, and turning the key.

Having thus described my invention,

What I claim is—

1. The combination of a register and its actuating mechanism with the hasp B of a padlock, arranged to operate as described, whereby the closing and opening of the hasp shall operate the register, substantially as set forth.

2. The combination of the movable guard $o$ and its link $b$ with the perforated case A, the register, and the swinging dog C, all constructed and arranged to operate substantially as and for the purpose set forth.

3. The combination of the projecting arm $l'$ of the hasp B, with the swinging arm G, having the tumblers mounted thereon, and provided with the shoulder $n$, for disconnecting the tumblers from their operating wheels, to change the combination, as set forth.

H. S. SHEPARDSON.

Witnesses:
  SAML. D. BARDWELL,
  W. C. DODGE.